United States Patent [19]

Nemoto et al.

[11] Patent Number: 4,642,621
[45] Date of Patent: Feb. 10, 1987

[54] IMAGE DISPLAY SYSTEM FOR COMPUTERIZED TOMOGRAPHS

[75] Inventors: Kayoko Nemoto; Takeshi Ohya, both of Tokyo, Japan

[73] Assignee: Yokogawa Medical Systems, Limited, Tokyo, Japan

[21] Appl. No.: 593,878

[22] Filed: Mar. 27, 1984

[30] Foreign Application Priority Data

Nov. 29, 1983 [JP] Japan ................................. 58-225184

[51] Int. Cl.⁴ ............................................... G09G 1/00
[52] U.S. Cl. .................................... 340/721; 340/723; 340/724; 340/799; 340/747; 364/417
[58] Field of Search ............... 340/721, 723, 724, 799, 340/747; 364/413, 415, 417

[56] References Cited

U.S. PATENT DOCUMENTS

| | | | |
|---|---|---|---|
| 4,107,780 | 8/1978 | Grimsdale et al. | 340/721 |
| 4,197,590 | 4/1980 | Sukonick et al. | 340/721 |
| 4,317,114 | 2/1982 | Walker | 340/721 |
| 4,495,594 | 1/1985 | Eggebrecht et al. | 340/723 |
| 4,533,910 | 8/1985 | Sukonick | 340/724 |
| 4,546,349 | 10/1985 | Prohofsky et al. | 340/724 |
| 4,550,315 | 10/1985 | Bass et al. | 340/721 |

*Primary Examiner*—Gerald L. Brigance
*Attorney, Agent, or Firm*—Moonray Kojima

[57] ABSTRACT

Two different CT images are stored respectively in a primary image memory and a secondary image memory. For image display, the secondary image is inset in a desired rectangular region in the main image memory so that the two images can simultaneously be displayed. The data for the two images to be displayed can be independently subjected to various types of processing in real time, such as window or level processing, blinking for flashing displayed image data pixels in a particular CT value zone, and reverse video operations.

1 Claim, 12 Drawing Figures

FIG.7(a)
FIG.7(b)
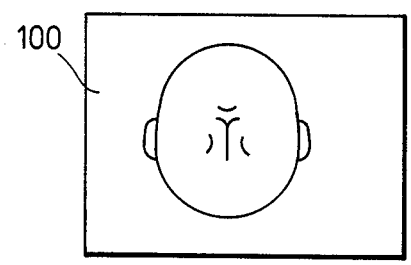 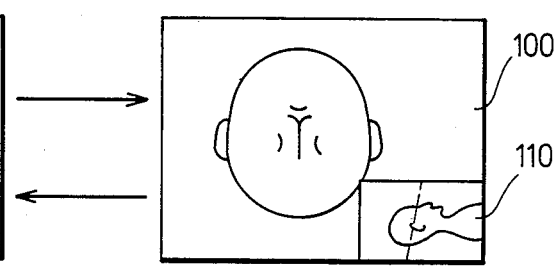
FIG.8(a)
FIG.8(b)
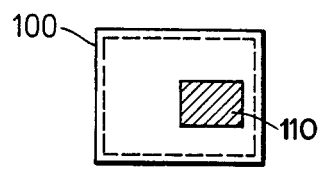 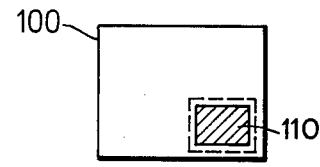
FIG.8(c)
FIG.8(d)
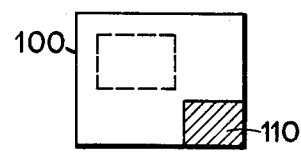 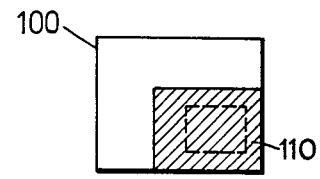

IMAGE DISPLAY SYSTEM FOR COMPUTERIZED TOMOGRAPHS

BACKGROUND OF INVENTION

1. Field of Invention

This invention relates to an image display system for use in a computerized tomograph, and more particularly to such a system which is capable of simultaneously displaying two images on the same screen, one image being representative of primary information and the other image being of additional separate information which can be selected as desired.

2. Description of Prior Art

In the art, there are known computerized tomographs for emitting a radiant ray, such as an X-ray beam, at a number of angles in a plane across a subject or patient, deriving a number of pieces of information (projection data) depending on the intensities of the radiant ray having passed through the patient, processing these pieces of information with a computer to determine distribution of radiation absorptivities of body sections in that plane for reconstructing a sectional image of the patient, and displaying the reconstructed image on a display screen such as a cathode ray tube.

Some computerized tomographs also include capability for displaying additional information together with the primary image displayed on the screen. FIG. 1 shows in block diagram form one example of a prior image display system having such an image display capability. Image data to be displayed on a cathode ray tube (hereinafter called "CRT") 50, are stored in an image memory 20. Image memory 20 has storage areas in a 1:1 correspondence to the pixels on the CRT screen. The image data stored in image memory 20 can be read out in the same sequence as that in which the CRT is scanned, in response to designation of pixel addresses by a pixel address generator 10. A display data processor 30 processes the image data as read out of image memory 20. The processed image brightness data are then combined by a composite signal generator 40 with a synchronizing signal issued for CRT display by a synchronizing signal generator (not shown) controlled by a central processing unit (CPU) 60. Composite signal generator 40 then delivers a composite video signal to CRT 50.

There are certain instances in which a secondary image is simultaneously displayed, by insetting the secondary image in the primary tomographic image on the CRT screen. Each time such an inset image is to be displayed, however, it has to be stored in a storage region 21 (see FIG. 2) to be extracted in primary image memory 20, which has addresses in a 1:1 correspondence to the pixel position addresses on the screen. This produces certain disadvantages, such as, for example:

1. When a secondary image is stored in the image memory, previous primary image information stored in the storage region, is destroyed, and hence such primary image data will be erased at the time the insetting mode is switched off.

2. Real time processing of image data from the image memory, such as window processing, level processing, blinking for flashing displayed image data pixels in a particular CT value zone, reverse video, and stressed image boundaries or edges, is affected equally throughout the screen. A display area to be processed and the remaining display area not being processed, cannot be observed simultaneously.

3. Where display data in the extracted storage region is of the same kind as that of data in the remaining storage region, they may be processed in the same manner. However, it would be more effective to differently process data of different kinds that are stored in the extracted region and in the remaining storage region. Since the primary and secondary images have been heretofore processed equally, either the primary image or the secondary image tends to become to the observer unequal in image quality with respect to the other, and it is difficult to compare the primary image with the secondary image.

SUMMARY OF THE INVENTION

Accordingly, it is an object of the invention to overcome the aforementioned and other deficiencies and disadvantages of the prior art.

Another object is to provide an image display system which is capable of displaying inset images in desired rectangular regions and switching on and off the insetting mode, in real time.

A further object is to provide an image display system which is capable of switching real time display data processing in desired rectangular regions and switching on and off such processing in real time.

Still further object is to provide an image display system which has both the foregoing two capabilities for displaying a plurality of pieces of information on one screen and for selecting display processing modes best suited to the displayed information to thereby enable facilitated comparison of displayed information.

The foregoing objects and other objects are attained in the invention, which encompasses an image display system for use in a computerized tomograph comprising a display screen for displaying the image, the display screen having pixel position addresses; an image memory for storing data of the image before the image is displayed on the display screen, the image memory comprising a primary image memory for storing data of a primary image and a secondary image memory for storing data of a secondary image, each of the primary image and secondary image memories having data storage addresses in 1:1 correspondence to the pixel position addresses on the display screen; an image memory address selector for determining data storage addresses on the image memory from the pixel position addresses on the display screen; a plurality of display data processors for differently processing the image data delivered from the image memory; a display data processor selector for selecting one of the display data processors based on the pixel position addresses on the display screen; and control means for controlling the image memory address selector to inset part of the secondary image in a rectangular region in the primary image and eliminate the inset part of the secondary image from the primary image in real time, and for controlling the display data processors to differently process the data of the primary and secondary images, thereby to simultaneously display the primary and secondary images on the display screen.

BRIEF DESCRIPTION OF DRAWING

FIGS. 7(A) and 7(B) are views depicting displayed images.

FIGS. 8(A), 8(B),8(C) and 8(D) are views depicting combinations of displayed images and types of image processings.

DETAILED DESCRIPTION OF PREFERRED EMBODIMENTS

Figure 1:
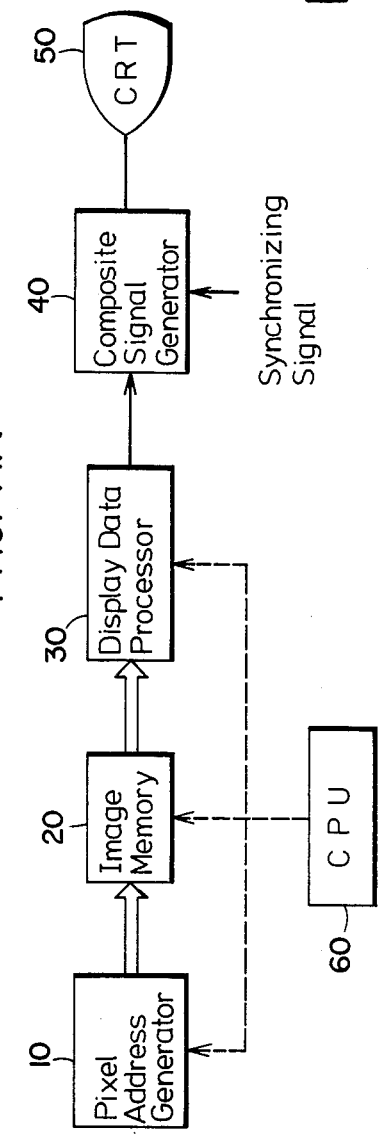
FIG. 1 is a block diagram depicting a conventional image display system.
Figure 2:
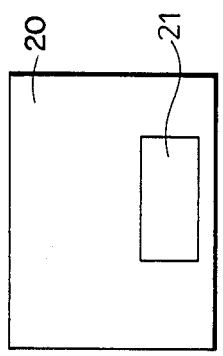
FIG. 2 is a diagram depicting the memory map of a conventional image memory.
Figure 3:
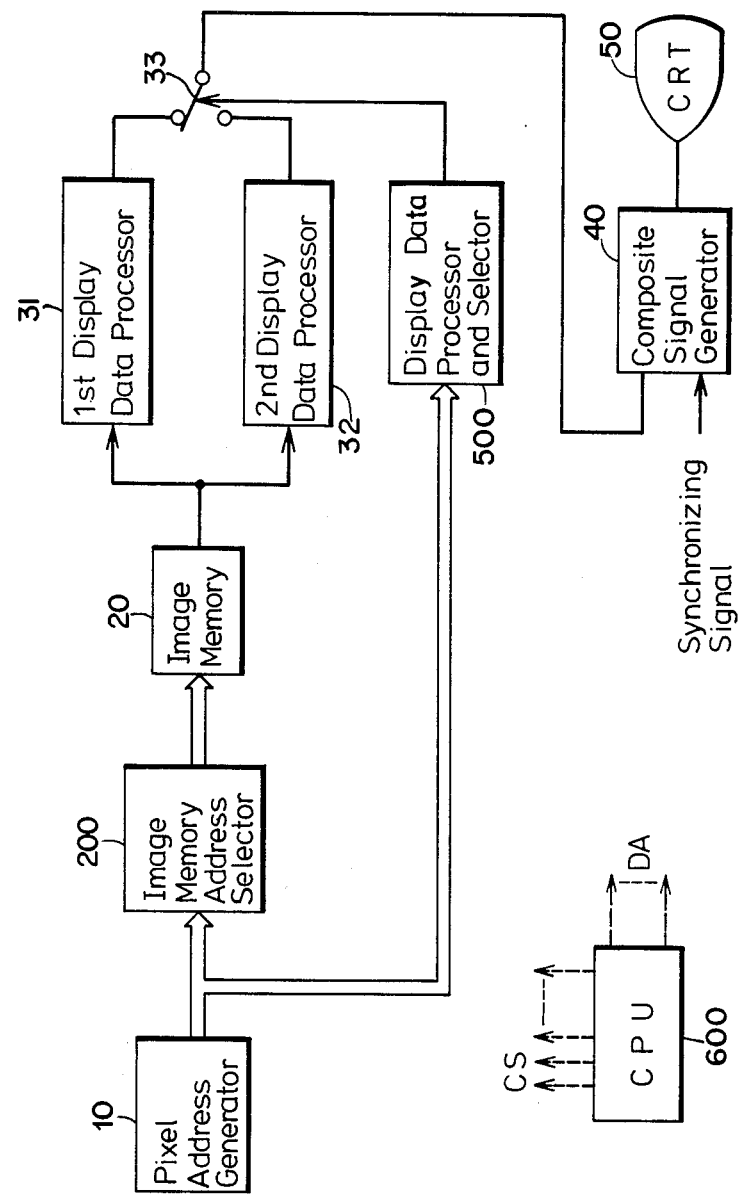
FIG. 3 is a block diagram depicting an illustrative embodiment of the invention.

FIG. 3 depicts an illustrative embodiment of the invention, and encompasses an image display system. Like or corresponding parts to those in FIG. 1 are similarly designated, and where already described, will not be described hereat for sake of convenience.

Figure 4:
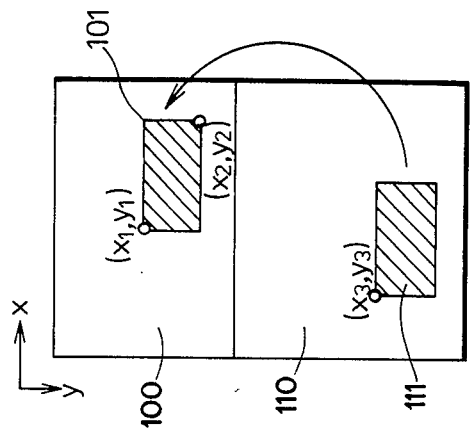
FIG. 4 is a diagram depicting a memory map of an image memory used in the embodiment of FIG.3.

An image memory address selector 200 serves to determine whether an address generated by pixel address generator 10 has reached an image insetting region on the screen along raster scanning lines, and also to switch addresses for the image memory to inset image memory addresses while they are in the image insetting region. Image memory 20 comprises a primary image memory 100 (see FIG. 4) for storing primary image data and a secondary image memory for storing secondary image data to be inset in a primary image display.

The image display system also includes first and second display data processors 31, 32 for differently processing image data from image memory 20 in real time, a display data processor selector 500 for determining a display data processing switching region and producing a display data processing switching signal to control a display data selecting switch 33 for selecting first display data processor 31 or second display data processor 32 and a central processing unit (CPU) 600, for sending control signals CS and data DA, to the appropriate components of the image display system.

Operation of the image display system is as follows: When a storage region 111 (see FIG. 4) in secondary image memory 110 is to be inset in primary image memory 100, addresses (start addresses $x_1$, $y_1$ and end addresses $x_2$, $y_2$) of a storage region 101 to be extracted from primary image memory 100, and a start address $x_3$,$y_3$ of storage region 111 in secondary image memory 110 are set in image memory address selector 200 (see FIG. 3). Image memory address selector 200 compares these addresses with addresses delivered from pixel address generator 10, and automatically replaces primary image addresses with secondary image addresses and generates the former or latter addresses dependent on the scanning of CRT50.

The image data thus read out of image memory 20 are fed in parallel to display data processor 31,32 in which the supplied data are processed. Display data processor selector 500 selects processed data from display data processor 31 or 32 for display on CRT 50.

The processed images are then combined by composite signal generator 40, with a synchronizing signal, into a video signal which is then displayed on CRT 50.

Figure 5:
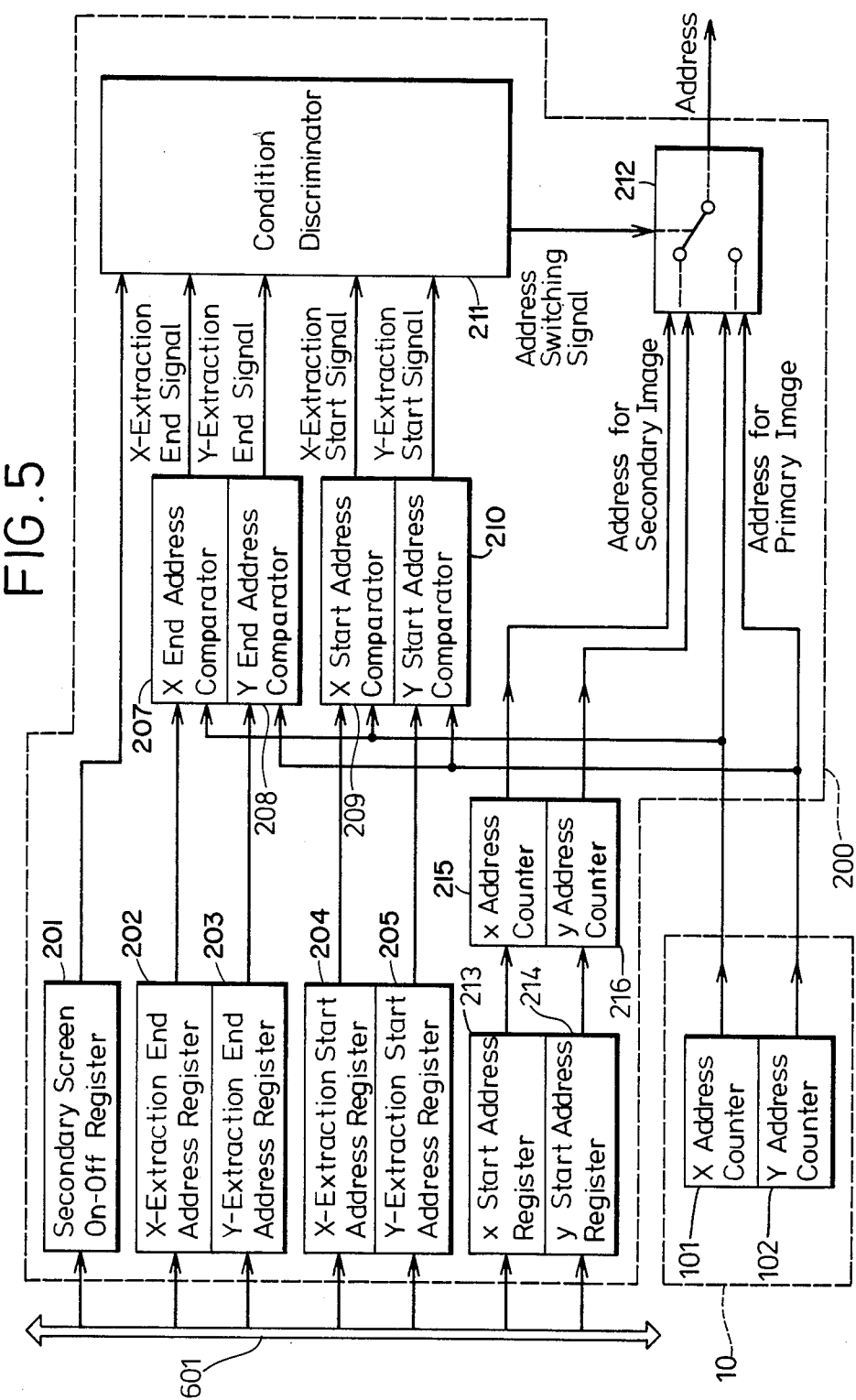
FIG. 5 is a block diagram depicting a pixel address generator and image memory address selector, used in the embodiment of FIG. 3.

FIG. 5 shows a detailed arrangement of image memory address selector 200. Data are supplied from CPU 600 (see FIG. 3) through a data bus 601 and set in registers 201,202,203,204,205, 213,214. More specifically, data indicative of conditions for switching on and off the secondary image display are set in secondary screen on-off register 201; the extraction end address $x_2$, $y_2$ are set in primary image memory 100 (see FIG. 4) and in the X- and Y-extraction end address register 202, 203, respectively; the extraction start address $x_1$, $y_1$ are set in primary image memory 100 and in the X- and Y-extraction start address registers 204,205, respectively; and the start address $x_3$,$y_3$ are set in secondary image memory 110 in the X- and Y-start address registers 213,214, respectively.

The address data thus set in the registers 202,203,204,205 are then led respectively to address comparators 207,208, 209 and 210 for comparison with pixel addresses. More specifically, X start address comparator 209 generates an X-extraction start signal when the x-direction pixel address x from the pixel address generator 10 exceeds the value stored in the X-extraction start address register 204. Similarly, the Y start address comparator 210 generates a Y-extraction start signal when the Y-direction pixel address y from the pixel address generator 10 exceeds the value stored in the Y-extraction start address register 205.

The X and Y end address comparators 207 and 208 generates X- and Y-extraction end signals, respectively, when the pixel address from the pixel address generator 10 exceeds the value stored in the X- and Y-extraction end address registers 202,203.

A condition discriminator 211 is responsive to signals from address comparators 207,208,209, 210, and secondary screen on-off register 201, for determining whether the pixel address is inside or outside the storage region to be extracted from the primary image data and for energizing an address switching circuit 212 with an address switching signal dependent on the results of the determination. Address switching circuit 212 selects primary image addresses from pixel address generator 10 when the pixel address is indicative of an address outside of the storage region to be extracted, and selects secondary image addresses from x and y address counters 215,216, when the pixel address is indicative of an address in the storage region to be extracted.

The x and y address counters 215,216 set the values stored in the x and y start address registers 213,214, respectively, as initial values and their counts are incremented according to a clock signal for scanning CRT 50.

Memory address selector 200 can automatically generate addresses for primary image memory 100 and addresses for secondary image memory 110 which are to be inset in the primary image memory.

Figure 6:
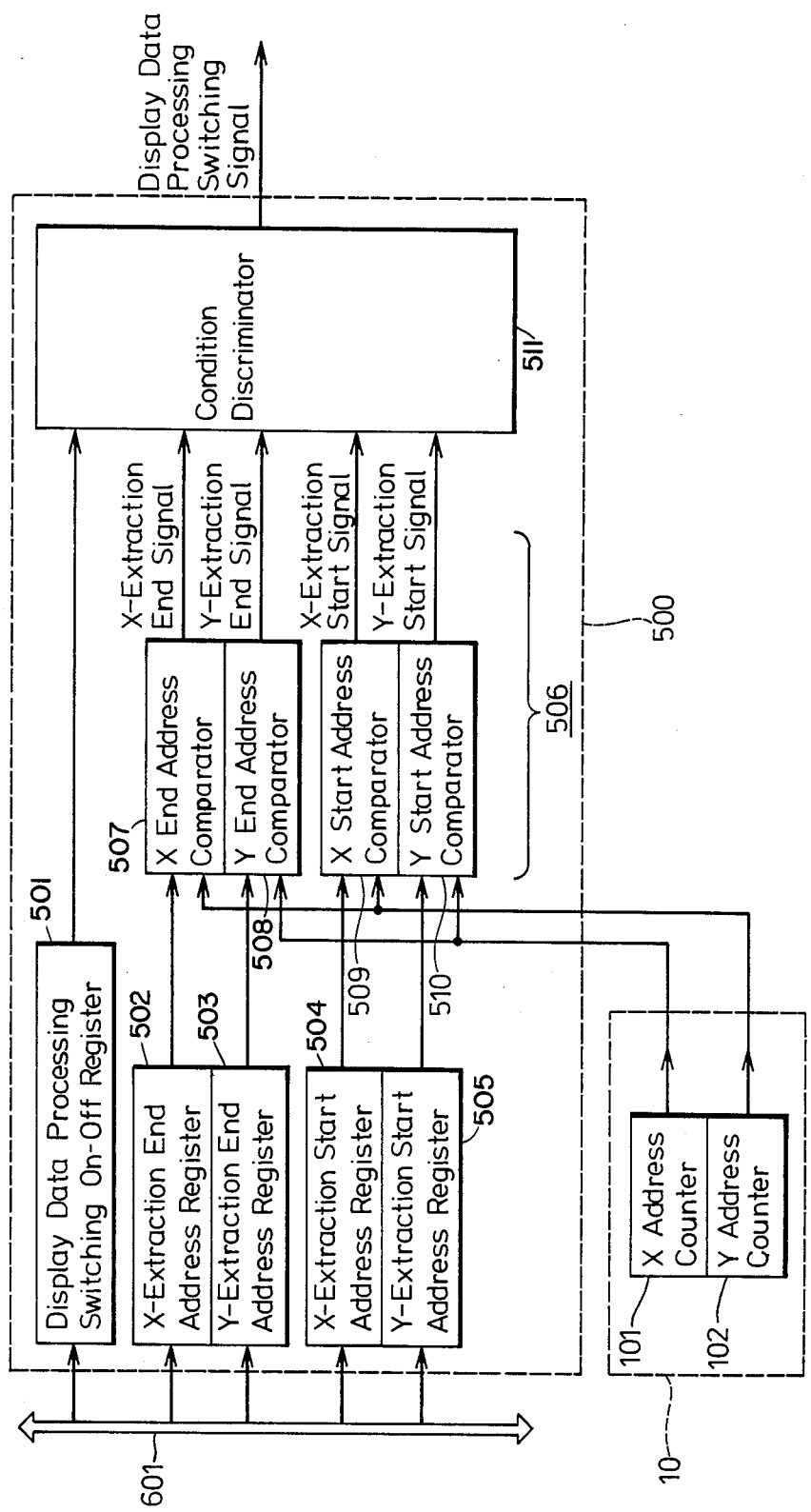
FIG. 6 is a block diagram depicting a pixel address generator and a display data processor selector used in the embodiment of FIG. 3.

FIG. 6 shows details of display data processor selector 500, which is similar in construction to the image memory address selector 200 and used for determining whether the pixel address is representative of an address inside or outside of the region to be extracted from the primary image memory and for issuing a signal to energize selecting switch 33, dependent on the results of the determination. Information indicative of whether display data processors 31,32 (see FIG.3) are to be changed over is fed from CPU 600 to a display data processing switching on-off register 501. When the information fed to the register 501 is "ON", a condition discriminator 511, is enabled, to determine whether the pixel address is representative of an address inside or outside of the region to be extracted from the primary image memory. When the information is "OFF", no determination is made and no display data processing switching signal is generated by condition discriminator 511.

FIGS. 7(A) and 7(B) depict images displayed on CRT 50 by the foregoing operation of the illustrative image display system. FIG. 7(A) illustrates a displayed image of a cross section of a human head, which is stored in primary image memory 100. FIG. 7(B) shows such a displayed image, with a scout image stored in the secondary image memory 110, being inset therein. Since the secondary image can be displayed without, rewriting the image data in the primary image memory, CRT 50 will be able to advantageously display the complete primary image again without any image loss corresponding to the storage region extracted from the primary image memory.

Although in the above embodiment, only one image insetting region is depicted, an insetting region setting register may be used for designating a plurality of image insetting regions.

Similarly, a plurality of display data processing switching regions can be designated. In addition, by providing a plurality of display data processors, a plurality of differently processed data items can be simultaneously displayed on the screen.

Where the image insetting region is equal to the display data processing switching region, the address switching signal from condition discriminator 211 in image memory address selector 200 may be used as the display data processing switching signal. In such case, display data processor selector 500 may be dispensed with.

Any desired rectangular region can be displayed through different data processing routines by switching such routines.

The data processors may comprise control circuits for controlling windows and levels for effecting two independent windowing or leveling types. The data processors may also have capabilities for effecting reverse video and blinking operations.

Since the image memory address switching and the display data processing switching are independent of each other, the following combinations are possible.

1. The secondary image 110 and the primary image 100 can be switched to a particular type of processing, as shown by the broken lines in FIG. 8(A).
2. Only the secondary image 110 is subjected to a particular type of processing as shown in FIG. 8(B).
3. The secondary image 110 is displayed and the primary image 100 is subjected to two display data processing types as shown in FIG. 8(C).
4. The secondary image 110 is subjected to two display data processing types as shown in FIG. 8(D).

With the arrangement of the invention, other image data can be inset in a desired rectangular region in a primary image and displayed simultaneously with the primary image by switching addresses in the image memory. Since no data are rewritten in the image memory, the secondary image can be switched on and off in real time.

In the image display of computerized tomographs, therefore, axial and scout images can be simultaneously be displayed, to allow observation of a correspondence between the different images, for more efficient and effective image diagnosis.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A computerized tomograph image display system comprising
   a display screen for displaying a separate secondary image alone in a selected region of the screen with the remaining regions of the screen displaying only a primary image;
   an image memory for storing primary and secondary image data comprising a primary image memory block for storing data of a primary image and one or more secondary image memory blocks for storing data of one or more secondary images, said secondary images being different from said primary image;
   a pixel address generator for generating signals designating pixel addresses of the data in said image memory;
   control means;
   image memory address selector, under control of said control means and responsive to signals from said pixel generator, for selectively determining addresses of inset regions on said display screen and for generating and inputting to said image memory a signal indicative of the addresses of said inset regions, thereby to switch addresses from primary to secondary memory blocks in the image memory to inset secondary image memory addresses during the time the pixel addresses are in the inset regions;
   display data processor means connected to said image memory for processing image data read from said image memory and comprising a first processor for processing image data from said image memory, and at least a second processor for processing image data from said image memory, and switching means for switching the output processed signals outputted from said first processor and said second processor;
   a composite signal generator, under control of said control means and connected through said switching means for obtaining output processed signals from either said first or said second processor, for generating composite video signals which are supplied to operate said display screen; and
   display data processor selector, connected to said switching means and under control of said control means and receiving signals from said pixel generator, for determining pixel addresses representative of regions on said screen for selected display of images from signals outputted from a selected one of the first and second processors, and in response to such determination, for selectively operating said switching means to selectively apply output signals outputted respectively from either the first or the second processor to said composite signal generator;
   wherein said image memory address selector comprises
      a data bus connected to said control means;
      an ON-OFF register connected to said data bus for registering data indicative of condition for switching ON and OFF said secondary image display on said screen;

a plurality of address registers connected to said data bus and having designated therein one or more addresses in said primary image memory block;

a discriminating means, connected to said pixel address generator and to said primary address registers, for discriminating addresses in said primary image memory block by comparing the output of said plurality of address registers and the output of said pixel address generator and generating thereby an output discriminating signal;

one or more secondary address generators connected to said data bus, each having designated therein addresses in said one or more secondary image memory blocks; and address selecting means, connected to said pixel address generator, said secondary address generators, and said discriminating means, for selecting image memory addresses among the output of said pixel address generator and the output of said one or more secondary address generators, based on the output discriminating signal from said discriminating means, and for supplying the selected primary or secondary image addresses to said image memory; and wherein said display data processor selector comprises data bus connected to said control means;

display data processing ON-OFF register for registering data indicative of the condition for switching ON and OFF said display data processing;

a plurality of primary address registers connected to said data bus and having designated therein one or more addresses in said primary image memory block; and discriminating means, connected to said pixel address generator and to said primary address registers, for discriminating an address in said primary image memory block by comparing the output of said plurality of primary address registers and the output of said pixel address generator and for generating a switching signal, said switching signal selectively operating said switching means to connect the output of either said first or said second processor to said composite signal generator.

* * * * *